United States Patent
Mais et al.

(10) Patent No.: US 8,205,493 B2
(45) Date of Patent: Jun. 26, 2012

(54) PLUG-IN SENSOR HAVING IMPROVED FLUID MECHANICS

(75) Inventors: Torsten Mais, Ludwigsburg (DE); Uwe Konzelmann, Asperg (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 398 days.

(21) Appl. No.: 12/310,938

(22) PCT Filed: Aug. 21, 2007

(86) PCT No.: PCT/EP2007/058645
§ 371 (c)(1),
(2), (4) Date: Dec. 2, 2009

(87) PCT Pub. No.: WO2008/037546
PCT Pub. Date: Apr. 3, 2008

(65) Prior Publication Data
US 2010/0064799 A1 Mar. 18, 2010

(30) Foreign Application Priority Data
Sep. 27, 2006 (DE) .................... 10 2006 045 656

(51) Int. Cl.
*G01F 1/68* (2006.01)
(52) U.S. Cl. .................... 73/202.5; 73/204.22
(58) Field of Classification Search .................. None
See application file for complete search history.

(56) References Cited

U.S. PATENT DOCUMENTS

| | | | |
|---|---|---|---|
| 4,571,996 A * | 2/1986 | Wakeman et al. | 73/202.5 |
| 4,981,035 A | 1/1991 | Hall | |
| 5,355,726 A * | 10/1994 | Zurek et al. | 73/202.5 |
| 5,571,964 A | 11/1996 | Sawada et al. | |
| 5,631,415 A * | 5/1997 | Igarashi et al. | 73/202.5 |
| 5,696,321 A * | 12/1997 | Igarashi et al. | 73/202.5 |
| 6,422,070 B2 * | 7/2002 | Reymann et al. | 73/114.34 |
| 6,513,375 B2 * | 2/2003 | Uramachi et al. | 73/204.22 |
| 6,871,534 B1 * | 3/2005 | Hamada et al. | 73/204.22 |
| 7,059,183 B2 * | 6/2006 | Kikawa et al. | 73/202.5 |
| 7,377,161 B2 * | 5/2008 | Kikawa et al. | 73/202.5 |
| 2006/0021429 A1 * | 2/2006 | Konzelmann et al. | 73/202.5 |
| 2006/0225497 A1 * | 10/2006 | Kikawa et al. | 73/202.5 |
| 2006/0266110 A1 * | 11/2006 | Kouno et al. | 73/202.5 |
| 2007/0062276 A1 * | 3/2007 | Konzelmann et al. | 73/204.21 |
| 2007/0169548 A1 * | 7/2007 | Kikawa et al. | 73/202.5 |

FOREIGN PATENT DOCUMENTS

| | | |
|---|---|---|
| DE | 196 01 791 | 7/1997 |
| DE | 101 11 840 | 10/2002 |
| DE | 10 2004 022 | 2/2005 |
| JP | 4-128615 | 4/1992 |
| JP | 8-5429 | 1/1996 |
| WO | WO 2005/008189 | 1/2005 |

* cited by examiner

*Primary Examiner* — Harshad Patel
(74) *Attorney, Agent, or Firm* — Kenyon & Kenyon LLP

(57) ABSTRACT

A plug-in sensor for determining an aspirated air mass of an internal combustion engine flowing through a flow pipe has a plug part, which is able to be introduced into the streaming medium with a specified orientation to the main flow direction. Provided in this plug part is at least one flow channel having at least one inlet opening and at least one outlet opening. Accommodated in the at least one flow channel is at least one sensor for determining the at least one parameter. The plug part has a rounded inflow side, which points counter to the main flow direction. The plug part at least partially has an airfoil profile, which is designed such that an asymmetrical flow profile of the fluid medium comes about when the plug part is introduced into the streaming fluid medium.

13 Claims, 6 Drawing Sheets

PLUG-IN SENSOR HAVING IMPROVED FLUID MECHANICS

BACKGROUND OF THE INVENTION

1. Field of the Invention

The present invention is based on devices for measuring at least one parameter of a streaming fluid medium, in particular a fluid medium streaming through a flow pipe, as it is known in various fields of technology.

2. Description of Related Art

In many processes such as, for instance, in the field of industrial processing engineering, chemistry or machine construction, fluid media, especially masses of gas (e.g. an air mass) having particular properties (such as temperature, pressure, flow velocity, mass flow, etc.) have to be supplied in a defined manner. Among these are combustion processes, in particular, which run under regulated conditions.

An important application example is the combustion of fuel in internal combustion engines of motor vehicles, especially ones having subsequent catalytic exhaust gas purification, in which a certain air mass has to be supplied per unit time in a controlled manner (air mass flow). Various types of sensors are used to measure the air-mass throughput. One sensor type known from the related art is what is generally known as a hot-film air mass sensor (HFM), which is described in one specific embodiment in published German patent document DE 196 01 791, for example. A sensor chip, which has a thin sensor diaphragm, e.g., a silicon sensor chip, is generally utilized in such hot-film air mass meters. At least one thermal resistor, which is surrounded by two or more temperature measuring resistors (temperature sensors), is typically situated on the sensor diaphragm. An air flow that is routed across the diaphragm causes a change in the temperature distribution pattern, which in turn is detectable by the temperature measuring resistors and is able to be analyzed with the aid of a control and evaluation circuit. Thus, for instance, an air mass flow is able to be determined from a difference in resistance of the temperature measuring resistors. A number of other variations of this sensor type are known from the related art.

One problem with such a type of sensor known from published German patent document DE 101 11 840, for instance, is that contamination of the sensor element may frequently occur, such as contamination by water, oil or other fluids, or other types of soiling. As a rule, the sensor chip is used directly in the intake tract of the internal combustion engine or in a bypass to the intake tract of the internal combustion engine. During operation of the internal combustion engine, water or oil can deposit on the sensor chip and on the sensor diaphragm, in particular. This soiling deposit can lead to an undesired effect on the measuring signal of the sensor, especially because a fluid film on the surface of the sensor affects the thermal conductivity of the surface, which results in a falsification of the measuring signals. Similar problems occur not only in hot-film air mass meters, but in other types of sensors as well, which are used for measuring fluid parameters in a fluid flow.

In order to solve these problems with respect to contamination, and especially to prevent water and oil from reaching the sensor chip, various approaches are known from the related art. One approach, which is described in published German patent document DE 10 2004 022 271, for example, is the use of what is known as a bypass. In this connection, a plug-in sensor is utilized, which is plugged into an intake pipe via a plug part, an inlet opening being provided in the plug part on the inflow side. A main flow channel is provided in the plug-in sensor, through which a substantial part of the flow flows from the inlet opening to a discharge opening. At a sharp edge, which is also referred to as "nose", a bypass channel branches off from the main channel, in which bypass a sensor chip is disposed. The bypass channel eventually discharges into an outlet opening at the underside of the plug-in sensor. The sharp edge at the branching point of the bypass channel has the effect that water droplets, because of their mass inertia, are able to penetrate into the bypass channel only with difficulty, and that they remain in the main channel for the most part.

However, in the plug-in sensor constructions described in the related art it is disadvantageous that the plug-in sensors described, because of their aerodynamically disadvantageous shape often cause problems in the intake tract with regard to a loss in pressure attributable to flow resistance. In addition, the signal reproducibility of the signals from such sensors is comparatively low. For this reason, published German patent document DE 10 2004 022 271 provides a construction in which a flow diversion part is fixedly installed as a separate component in the flow pipe. As an alternative, a design of the flow diversion part in one piece with the plug-in sensor is also provided. Furthermore, a flow-conducting wall is fixedly installed in the flow pipe, which is intended to calm the flow downstream from the plug-in sensor.

The construction known from published German patent document DE 10 2004 022 271, however, entails various disadvantages in practice. One disadvantage is, for instance, that the flow-diversion part is normally fixedly installed in a section of the flow pipe. This fixed installation entails additional costs in the manufacture of this pipe section, just as does the provision of the additional flow-conducting wall. Furthermore, in the development as one piece the installation length is also too long for many applications. In addition, the construction described in published German patent document DE 10 2004 022 271 is able to be further optimized with respect to the pressure drop at the plug-in sensor.

BRIEF SUMMARY OF THE INVENTION

Therefore, a plug-in sensor for determining at least one parameter of a fluid medium streaming in a main flow direction is provided, which avoids the afore-described disadvantages of known constructions either entirely or partially. The fluid medium may be a fluid or a gas, and the at least one parameter may be, for example, a pressure, a temperature, a velocity, or an air-mass throughput or the like. Especially preferred is the development of the plug-in sensor as hot-film air mass sensor for measuring an aspirated air mass of an internal combustion engine, the air mass flowing through a flow pipe.

One basic idea of the present invention is to design the plug-in sensor in compact and universally utilizable manner, so that a complicated construction of the flow pipe is able to be dispensed with. According to the present invention, the path to this compact design with a low pressure drop and excellent signal reproducibility without additional auxiliary devices in the flow pipe leads around the plug-in sensor via a clearly defined external flow, which exhibits no sensitivity with respect to interruptions and different inflow states of the streaming fluid medium. According to the present invention, use is made of discoveries from aircraft construction (hydrodynamics, aerodynamics) for this purpose.

The plug-in sensor according to the present invention has a plug part, which is able to be introduced into the streaming fluid medium with a specified orientation to the main flow direction, the medium flowing in the flow pipe, in particular.

Provided inside the plug part is at least one flow channel having at least one inlet opening and at least one outlet opening, at least one sensor being accommodated within the at least one flow channel in order to determine the at least one parameter. As described above, the at least one sensor is preferably a hot-film air mass sensor chip. Furthermore, the plug part has a rounded inflow side, similar to published German patent document DE 10 2004 022 271, the rounded inflow side being integrated into the plug part, so that no additional developments of the flow pipe are required. The rounded inflow edge points counter to the main flow direction. At least one inlet opening of the at least one flow channel is disposed in the region of the rounded inflow side, counter to the main flow direction.

The special feature of the provided plug-in sensor is that the plug part at least partially has an airfoil profile which is designed in such a way that an asymmetrical flow of the fluid medium comes about when the plug is introduced into the flowing fluid medium. It is basically possible to use different developments of airfoil profiles, which are known from the airplane construction, for instance. The advantage of the design according to the present invention is that the use of the asymmetry effects makes it possible to selectively increase flow velocities on one side of the plug part and to reduce them on the other side. In this way increases in the velocity of the streaming fluid medium are able to be brought about where this is especially advantageous for the operation of the plug-in sensor. As is the case in one preferred development of the present invention, for instance, the at least one outlet opening (i.e., one or all outlet openings of the at least one outlet opening) may be disposed laterally on the at least one airfoil profile. The airfoil profile preferably has an outlet side with at least one outlet opening, and an opposite side without outlet opening. In this case the airfoil profile is preferably designed in such a way that, when the plug part is introduced into the streaming fluid media, a flow profile in the fluid media comes about in which the velocity of the streaming fluid media is higher on the outlet side than on the opposite side. Because of this increase in the flow velocity in the region of the at least one outlet opening, the throughput through the at least one flow channel is able to be increased and the functionality of the plug-in sensor is improved as a result due to the hydrodynamic suction effect.

The at least one flow channel is able to be designed as described in published German patent document DE 10 2004 022 271, for instance, (cf. also the above description of the related art). For example, the at least one flow channel may have at least one main channel and at least one bypass channel, the at least one main channel having at least one main flow outlet, and the at least one bypass channel having at least one bypass outlet. The at least one bypass outlet is then preferably disposed laterally on the at least one airfoil profile. As an alternative or in addition, the at least one main flow outlet may also be disposed laterally on the at least one airfoil profile.

The airfoil profile, as described earlier, may have different designs. It is especially preferred if the airfoil profile has a tail end on the side facing away from the flow when the plug-in sensor is introduced into the streaming medium, which tail end is essentially straight and essentially positioned perpendicular to the main flow direction. This design is similar to the design described in published German patent document DE 10 2004 022 271, the perpendicularly positioned tail end being advantageous for forming a separation region on the discharge side of the plug part.

The asymmetry in the flow profile around the airfoil profile is able to be produced in a variety of ways. One preferred possibility consists of introducing the plug part into the stream of the fluid medium at an angle of incidence to the main flow direction. An angle of incidence, as usual in airplane construction, is an angle between a profile center line of the airfoil and the main flow direction. According to the present invention, this angle of incidence preferably lies between 0 and 7°, especially preferred between 2° and 5°, an angle of 4° having shown to be especially advantageous. The optimum angle of incidence is a function of the utilized profiling or the utilized cross section of the airfoil profile.

A further, alternative or additional, option for bringing about an asymmetry in the flow profile around the airfoil profile consists of providing a profile curvature of the airfoil profile. A profile curvature means a curvature of the camber line of the airfoil, as usual in the airfoil construction. The camber line is the connection line of all maximum circles written into the airfoil profile. The profile curvature is usually indicated in percent, the percent number of the profile curvature being related to what is known as the profile depth, i.e., the length of the profile center line. According to the present invention, the profile curvature for an optimum operation of the plug-in sensor preferably lies in a range between 0 and 10%, preferably between 2% and 7% and, especially preferred, at approximately 5%.

Another basic idea of the present invention consists of the special design of asymmetrical flow profiles taking into account the flow separation of the fluid medium from the airfoil profile known from airfoil technology. It has become apparent, for example, that oscillations in the flow may occur during operation of conventional plug-in sensors, especially in load changes (but also during steady-state operation), in particular the separation of the flow boundary layers from the surface of the plug-in sensor. These oscillations lead to pressure fluctuations, which have an adverse effect on the signal quality of the plug-in sensor.

One idea according to the present invention, as an alternative or in addition to utilizing the asymmetrical flow profile in order to increase the throughput rate through the at least one flow channel, consists of providing a separation element on one side of the airfoil profile (preferably on precisely one side), which likewise provides an asymmetrical flow but which contributes to a stabilization of the flow separation from the plug part. This stabilization is implemented in such a way that the separation always takes place in a specified separation region on the airfoil profile without greater fluctuations or oscillations. For this purpose, the at least one separation element is preferably designed such that an at least local pressure minimum is induced on this side of the airfoil profile when the plug part is introduced into the streaming fluid medium. The more pronounced this fixed pressure minimum and the subsequent pressure increase, the more stable the separation of the streaming fluid medium from the plug part in this separation region.

A variety of examples of such separation regions are in turn known from the airfoil construction field, which may be utilized in order to induce this local pressure minimum (i.e., a local velocity maximum) in the flow. One preferred possibility consists of providing a bent profile on one side of the airfoil profile. In the region of this bend the airfoil profile has a discontinuous gradient, in which the gradient of the airfoil profile changes in a discontinuous manner. As in the following text, as well, the term "gradient" of the airfoil profile is understood as gradient relative to the main flow direction at a vanishing angle of incidence. This bent profile may be designed such, for instance, that the airfoil profile on the inflow side extends in curved fashion with a positive gradient before the bent profile, and on the downstream side, behind the bent profile, it extends at a negative gradient, preferably straight, preferably at an angle to a profile center line of the airfoil profile between 5° and 80°, especially preferred between 20° and 70°. In other words, this preferred development of the bent profile provides a slant of the plug part on the discharge side, the slant pointing toward the profile center line. This bent profile has proven a reliable separation element in practice, at which a pressure minimum occurs and at which flow boundary layers separate from the airfoil profile. Fluctuations of the separation region are thus able to be avoided in a reliable manner, so that the signal quality is able to be improved considerably even in changing load states. The airfoil profile exhibits low resistance overall, and the pressure drop at the plug part is low. With the aid of such developments, it is normally also possible to dispense with stabilizing gratings to calm the flow inside the flow pipe, which are commonly used these days.

A further alternative or additional option for designing the separation element consists of providing a stepped profile. A stepped profile is to be understood as a step in the airfoil profile, i.e., expressed in lay terms, first a "bent in one direction" and then "a bent in the opposite direction". Preferably, in particular due to the simplified construction, this stepped profile has a rectangular shape. Other stepped profiles are also conceivable, however, such as ones having projecting, sharply pointed steps, in order to induce an even more reliable separation of flow boundary layers in this region.

A third, alternative or additional, possibility of designing the at least one separation element consists of providing what is known as a "hill profile". A "hill profile" is to be understood as a profile in which the gradient of the airfoil profile from the inflow side of the fluid medium up to the discharge side (at a steady course) changes from a positive gradient to a negative gradient. The curvature in the region of the negative gradient is preferably greater than in the region of the positive gradient, and a "gradient" is to be understood as the first derivation of the airfoil profile, and the "curvature" is to be understood as the second derivation. As an alternative or in addition, it is also possible to provide a profile in which the separation element has a turning point in the course of the airfoil profile in the preferred separation region.

The two afore-described effects, i.e., facilitating the fluid throughput through the at least one flow channel by an asymmetrical flow profile, and the fixation of the separation region are able to be advantageously combined in that at least one of the at least one outlet openings is disposed in the region of the at least local pressure minimum. In particular at least one bypass opening may be disposed entirely or partially in the region of the at least one separation element and/or downstream from the at least one separation element. Such a placement of the at least one main flow outlet opening is also advantageous as an alternative or in addition. This special design of the set-up of the at least one outlet opening combines the two afore-described effects of the present invention in an especially advantageous manner. The exiting of air from the at least one outlet opening otherwise causes interruptions in the flow of the medium at just about every other location at the plug-in sensor. These interruptions are lowest in the region of the flow separation, which constitutes a further positive side effect of this placement.

DETAILED DESCRIPTION OF THE INVENTION

Figure 1A:
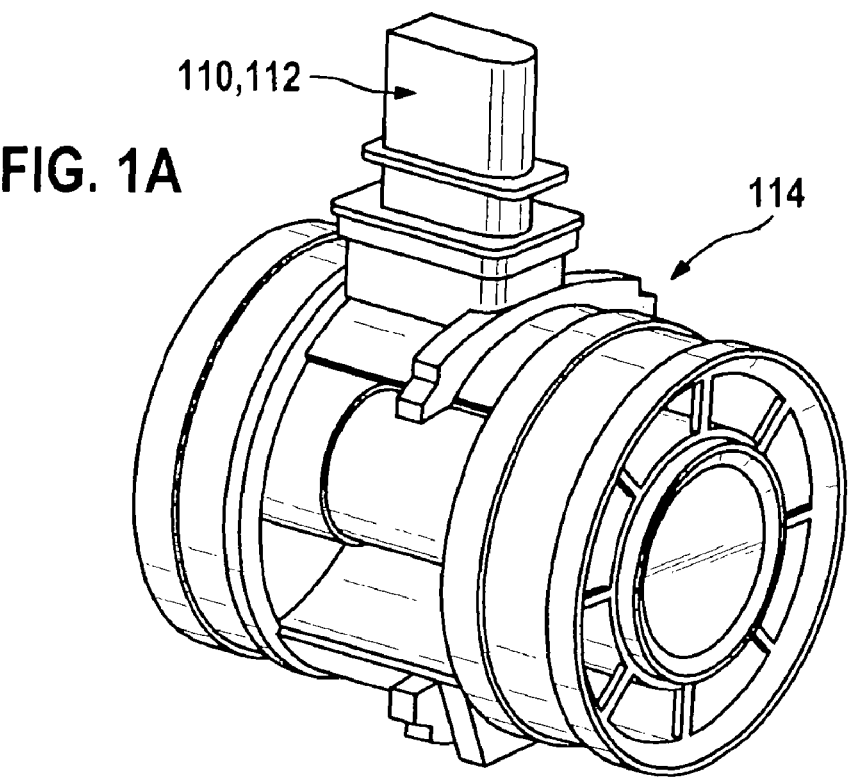
FIG. 1A shows a hot-film air mass meter inserted in the intake tract of an internal combustion engine.
Figure 1B:
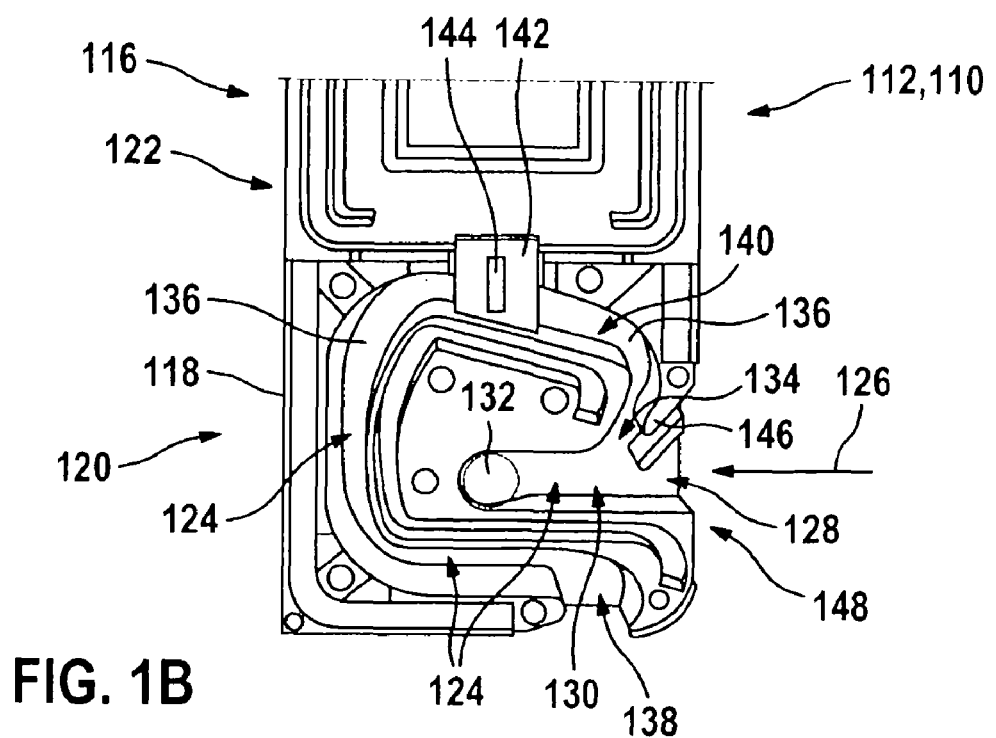
FIG. 1B shows an opened hot-film air mass meter in a top view.

FIG. 1A shows an exemplary embodiment of a plug-in sensor 110, which corresponds to the related art and, in this case, is developed as a hot-film air mass meter 112. Hot-film air mass meter 112 is installed in an intake tract 114 of an internal combustion engine, which is not shown in FIG. 1A. Such hot-film air mass meters 112 are commercially available. Hot-film air mass meter 112 is designed to detect the flow direction of an aspirated flow and is developed to record the load in internal combustion engines having gasoline or Diesel fuel injection. The hot-film air mass meter 112 is usually installed between an air filter and a throttling device, and it is usually installed as a preassembled module. Accordingly, plug-in sensor 110 has a plug part 116, which is shown in FIG. 1B in an opened state in a side view, and which projects into intake tract 114 in FIG. 1A. It can be seen in FIG. 1B that, in this exemplary embodiment of hot-film air mass meter 112, a measuring housing 118 of hot-film air mass meter 112 is subdivided into a flow region 120 and an electronics region 122. A flow channel 124 is accommodated in flow region 120, which, in this exemplary embodiment corresponding to the related art, is designed as described in published German patent document DE 10 2004 022 271. Plug-in sensor 110 has air flowing towards it in a main flow direction 126. The air flows into flow channel 124 through an inlet opening 128. Flow channel 124 has a main channel 130, which is essentially straight, along main flow direction 126, from inlet opening 128 to a main flow outlet 132. Main flow outlet 132 is located laterally in a wall of plug part 116. At a branching 134, a bypass channel 136 branches off from main channel 130, which extends, essentially following a curved course around main flow outlet 132, to a bypass outlet 138, which lies on the underside of plug part 116. In a straight section 140, a chip carrier 142 having a sensor chip inserted into it, extends from electronics region 122 into bypass channel 136. Chip carrier 142 is usually fastened (for instance, injection-molded) to an electronic circuit board accommodated in electronic region 122, which is not shown in FIG. 1B, the electronic circuit board being able to include an evaluation circuit and a control circuit of hot-film air mass meter 112.

In order to keep contamination, such as liquid contamination (e.g. water, oil) or solid contamination, from sensor chip 144, a sharp-edged nose 146 is provided at branching 134 of bypass channel 136. At this nose the main flow is separated from the part of the air flowing through bypass channel 136, in such a way that water droplets and other impurities continue to flow straight ahead through main channel 130, and essentially are unable to reach sensor chip 144.

One problem of hot-film air mass meter 112 corresponding to the related art is in the design of plug part 116, which has an essentially rectangular cross section in a sectional plane perpendicular to the drawing plane in FIG. 1B. Accordingly, plug part 116 has an inflow side 148 having a plane that is designed essentially perpendicular to main flow direction 126. One basic idea of the present invention is to design inflow side 148 as a rounded inflow side, the rounding being already integrated into plug part 116, and consequently also in plug-in sensor 110. All in all, plug part 116 has an airfoil profile 210 in a sectional plane perpendicular to the drawing plane in FIG. 1B, at least in the area of inlet opening 128, which is shown in exemplary fashion in FIG. 2. Using the basic representation in FIG. 2, the basic concepts of airfoil profile 210 will now be explained.

According to the present invention, airfoil profile 210 has a rounded inflow side 148, which is oriented essentially counter to main flow direction 126 when plug part 116 is installed in intake tract 114 of the internal combustion engine. In the case of an airfoil, inflow side 148 is frequently also referred to as congestion point.

Figure 2:
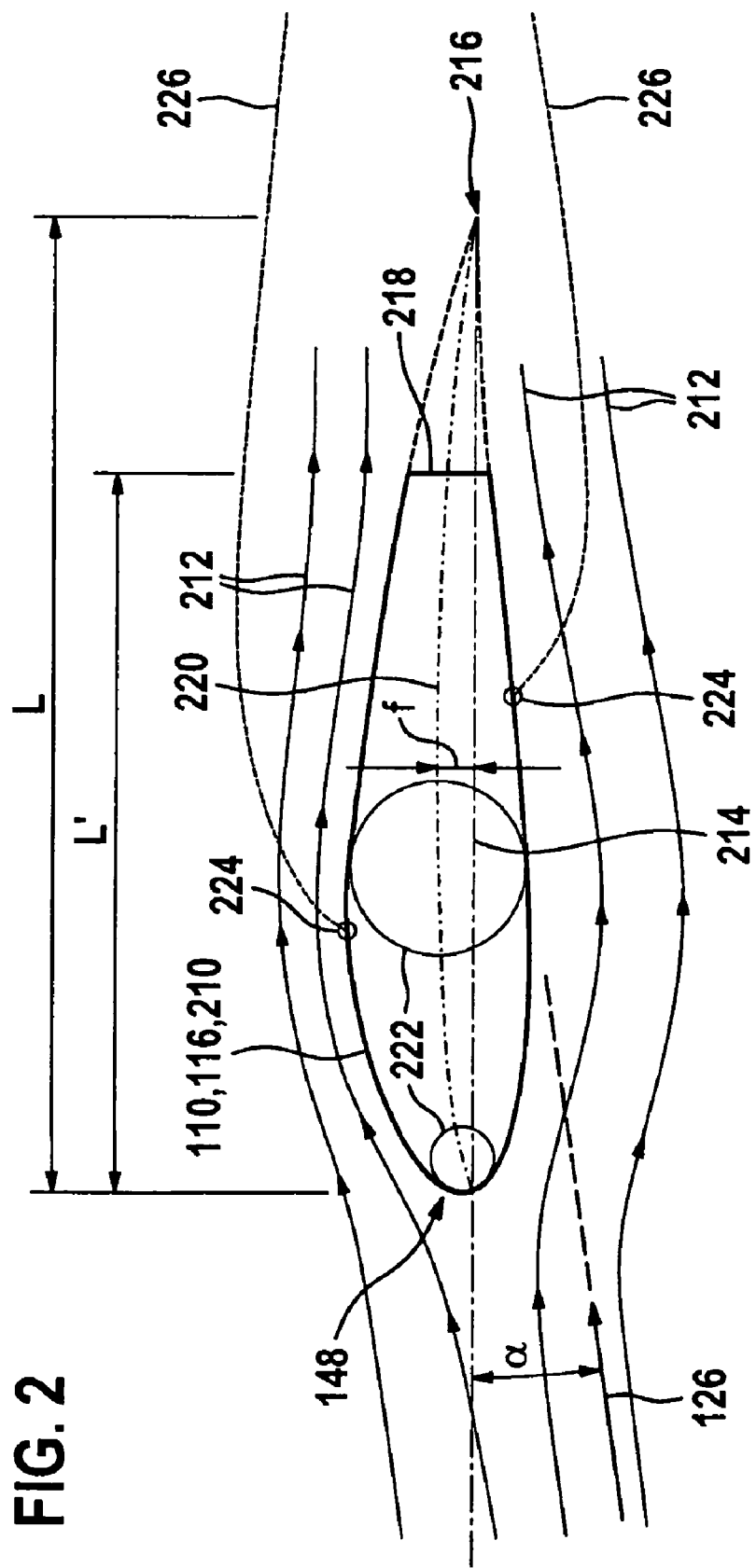
FIG. 2 shows a basic representation of an airfoil profile.

The flow of air around airfoil profile 210 is shown symbolically by flow lines 212 in FIG. 2. It becomes clear that the flow around airfoil profile 210 according to the present invention is asymmetrical for two reasons. On the one hand, profile center line 214, on an imaginary line between the apex of inflow side 148 and fictitious rear edge 216 of the airfoil profile, is tilted by an angle α relative to main flow direction 126. Because of that, the flow velocity above airfoil profile 210 rises, and below airfoil profile 210 it falls off. The pressure underneath airfoil profile 210 rises accordingly, and it drops over airfoil profile 210. This causes the known lifting effect of airfoils.

A special characteristic of airfoil profile 210 according to the exemplary embodiment in FIG. 2 is that airfoil profile 210 has more of a "cut-off" rear 218. This means that the rear is essentially perpendicular to profile center line 214, or rather, at a vanishing angle of incidence α, is perpendicular to main flow direction 126. Alternatively to the definition of profile center line 214 drawn in FIG. 2, this line could also be defined by saying that it extends from the apex of inflow side 148 to the center point of rear 218.

Besides the asymmetry, mentioned above, of the flow by angle of incidence α relative to main flow direction 126, in the exemplary embodiment of airfoil profile 210 according to FIG. 2, an additional asymmetry is brought on by a curvature of the profile. Thus, in FIG. 2, so-called camber line 220 is drawn in, which is obtained geometrically by inscribing inner circles 222 in airfoil profile 210. The totality of the centers of these inner circles 222 forms mean camber line 220. Profile curving means that this mean camber line 220, which would lie on profile center line 214 in a perfectly symmetrical airfoil profile 210, now deviates from this profile center line 214. The maximum deviation f of camber line 220 from profile center line 214 is referred to as profile curvature. This is frequently related to the overall length L of airfoil profile 210 and given as a percentage. In this context the overall length L, as drawn in FIG. 2, may be measured from the apex of inflow side 148 to fictitious rear edge 216, or (as in the case of the above numerical statements regarding the preferred profile arching) reference may be made to length L', which is measured between the apex of inflow side 148 and rear 218. Consequently, the profile curvature in percent is revealed as f/L'. The profile arching produces an additional asymmetry, which further increases the densification of flow lines 212 above airfoil profile 210, and thus the effect described of the increase in velocity in this region.

The pattern of flow lines 212 in FIG. 2 is shown in idealized fashion and is often not to be found in this manner in usual airfoil profiles 210. Actually, as a rule, a flow separation appears at one or more separation points on the upper side and partially also on the lower side of airfoil profile 210. In this context, one or more boundary layers 226, which until then had surrounded airfoil profile 210, normally separate from it and form one or more separation zones. These points of separation 224 and the separated boundary layers 226 are indicated symbolically in FIG. 2, it also being indicated that when airfoil profile 210 is engaged, upper separation point 224 is usually positioned closer to the inflow side than lower separation point 224. Instead of a well-defined separation point 224, which, in any case, does not represent a point but rather a line perpendicular to the drawing plane, separation points 224 may also be understood to be regions or zones having a finite extension.

Figure 3:
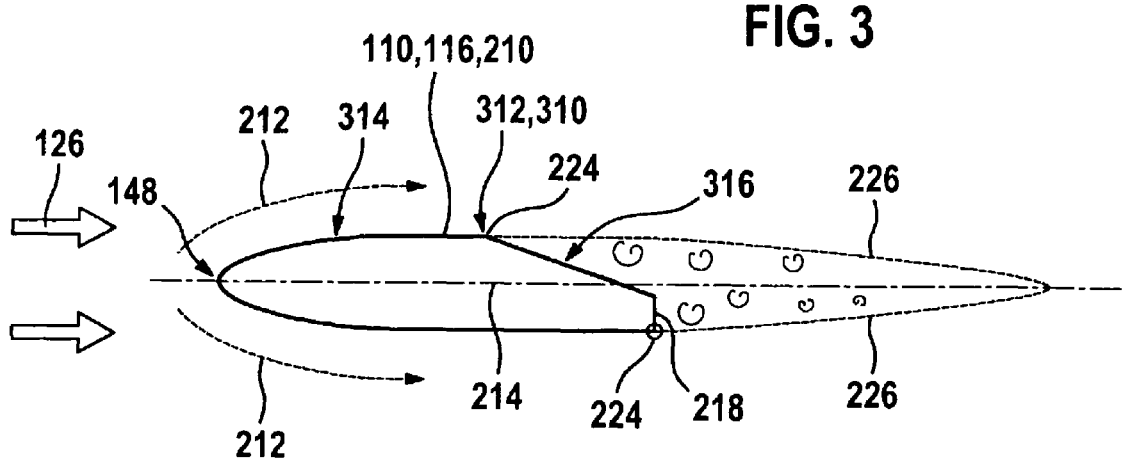
FIG. 3 shows a first exemplary embodiment of an airfoil profile of a plug-in sensor having a slant according to the present invention.
Figure 4:
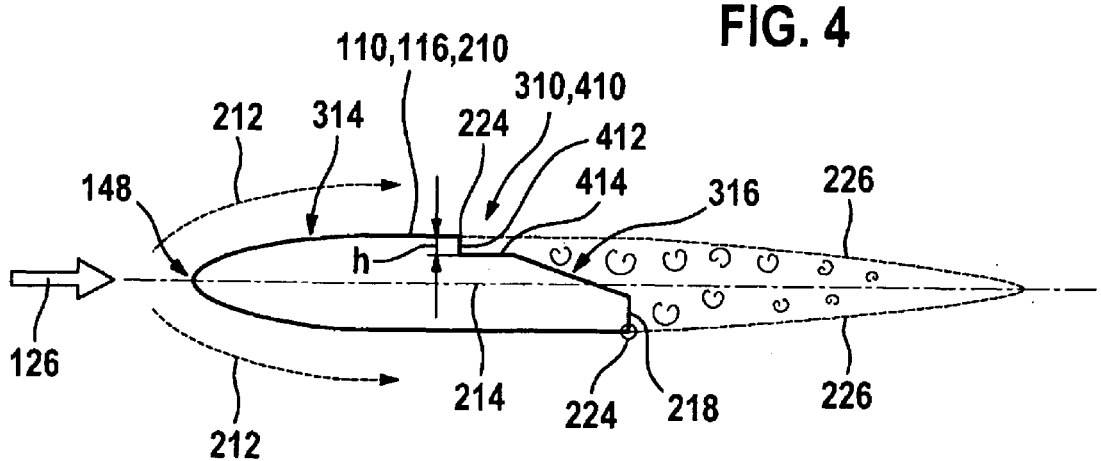
FIG. 4 shows a second exemplary embodiment according to the present invention of a plug-in sensor having a slant and a step.

One type of problem that was already mentioned earlier is that these separation points 224, at which separated boundary layers 226 form, are unstable in many cases and may even oscillate. However, the position of the separated boundary layers 226 relative to the position of main flow outlet 132 and of bypass outlet 138 has a considerable effect on the flow behavior in flow channel 124, and consequently on the signal properties of hot-film air mass meter 112. According to a further idea of the present invention, at least one separation element 310 may therefore be provided, which stabilizes and preferably fixes the position of separation point 224 on at least one side of airfoil profile 210, preferably on the upper side (that is, on the side having an increased flow velocity). FIGS. 3, 4 and 5 show various exemplary embodiments of such separation elements 310.

In the exemplary embodiment of an airfoil profile 210 shown in FIG. 3, a bent profile 312 is provided. As can be seen in FIG. 3, this bent profile 312 is found on the upper side of airfoil profile 210, approximately in the middle between inflow side 148 and rear 218, or rather slightly behind this middle. Airfoil profile 210 is designed in such a way that it is curved in front of bent profile 312, that is, on the inflow side, and runs at a positive gradient in curved region 314. Behind bent profile 312, that is, downstream from bent profile 312, airfoil profile 210 is flattened off in a flattened area 316, and runs there with a negative gradient, on an even level towards profile center line 214. Behind that, a cut-off rear 218 is again provided.

This embodiment of airfoil profile 210 having separation element 310 has the effect that upper separation point 224 is essentially fixed in place in separation element 310. On the underside of airfoil profile 210, separation point 224 will normally appear at the corner to vertical rear 218. The separated boundary layers are, in turn, designated by reference numeral 226 in FIG. 3 and are indicated symbolically. The flow about the front part of airfoil profile 210 is uniformly accelerated on both sides as far as separation points 224, which leads to a very stable, robust flow topology. The separated boundary layers 226 that are created are small in their extension, are stationary, and consequently do not interfere with the reproducibility of the measurement, or they interfere only negligibly. If airfoil profile 210 were symmetrical with a close-lying, accelerated flow on both sides, a substantially larger overall thickness would come about in plug part 116, and with that a greater material requirement and a greater pressure drop at plug-in sensor 110.

FIG. 4 shows an exemplary embodiment of an airfoil profile 210 alternative to that in FIG. 3, having a separation element 310. In contrast to the exemplary embodiment in FIG. 3, in this instance no bent profile 312 is provided, but rather a stepped profile 410, which in turn is followed downstream by a flattened area 316, analogously to FIG. 3. Stepped profile 410 in this case is designed as a right-angled step, having a first step surface 412 perpendicular to profile center line 214 and a second step surface 414 parallel to profile center line 214. Step height h advantageously amounts to at least 0.5 mm, other step heights, however, also being practicable. Step heights h in the range between 1% and 20% of the entire profile thickness of airfoil profile 210 are particularly preferred. Second step surface 414 typically has a length of between 1.0 and 7.0 mm, overall lengths of between 1% and 20% of the profile depth being preferred. The flow is unable to follow the sharp bend at this step and separates from the surface of airfoil profile 210. As a result, separated boundary layers 226 virtually always retain the same magnitude and shape and remain stable, even when the inflow conditions change. The stable flow topology reduces reactions of the flow upon the signal of hot-film air mass meter 112, and it leads to a better reproducibility of the measuring signal.

Other embodiments of step profile 410 are conceivable as well. Thus, first step surface 412 could, for instance, be situated at an angle with respect to profile center line 214 that deviates from 90°, so that the step would have a slight overhang inclined toward the downstream side, with a sharp edge (acute angle) at the upper side. This would further improve the fixing of separation point 224.

Figure 5A:
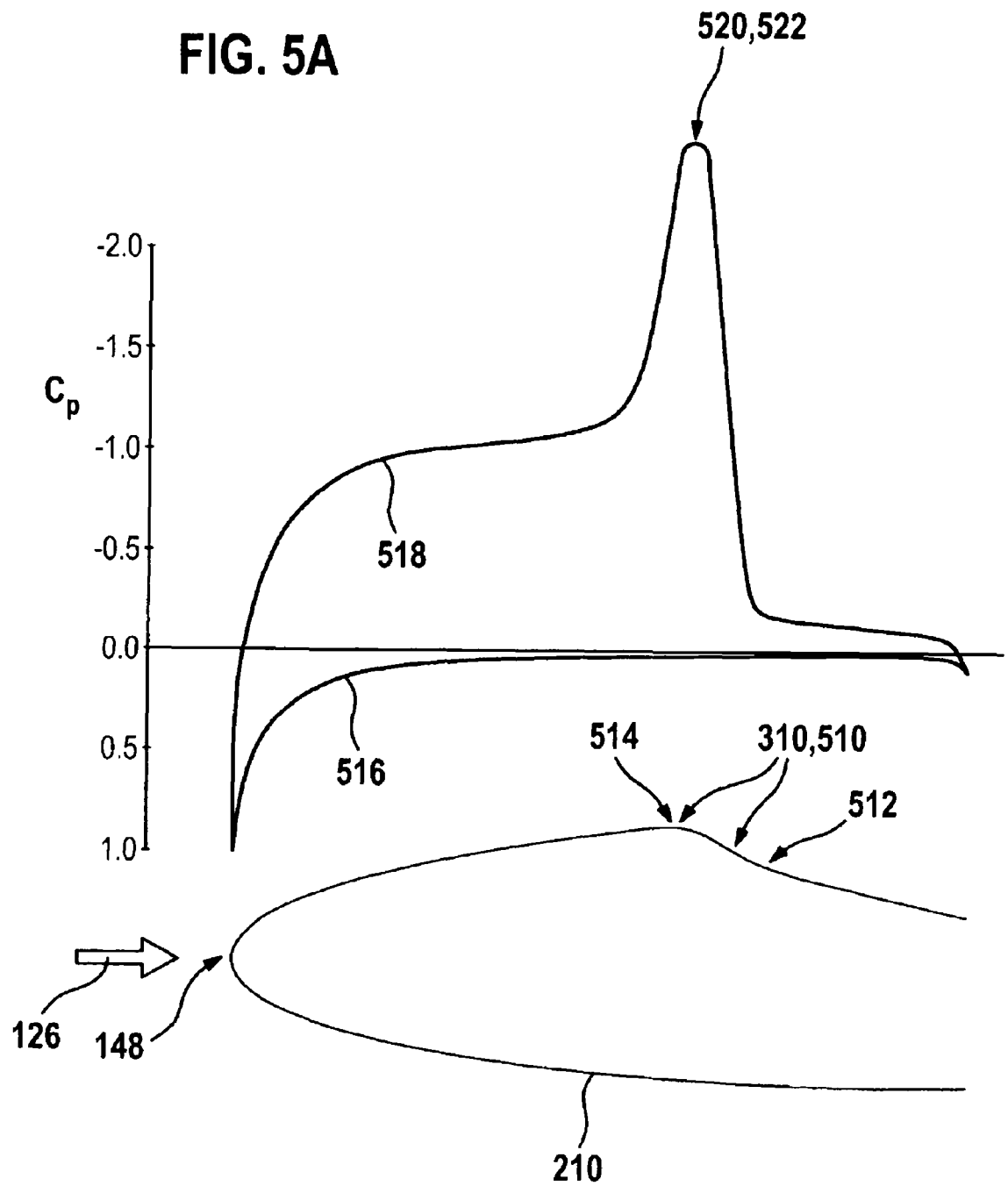
FIG. 5A shows a pressure profile plotted over a third exemplary embodiment of a plug-in sensor according to the present invention.
Figure 5B:
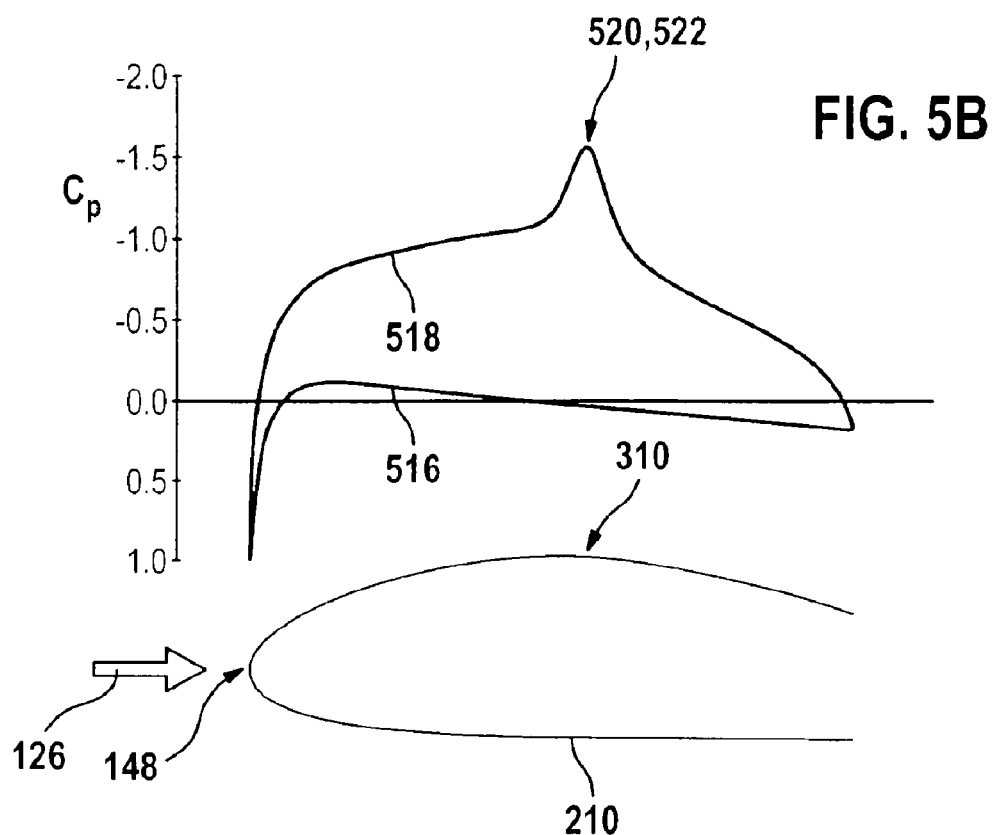
FIG. 5B shows a pressure profile over a fourth exemplary embodiment of a plug-in sensor.
Figure 5C:
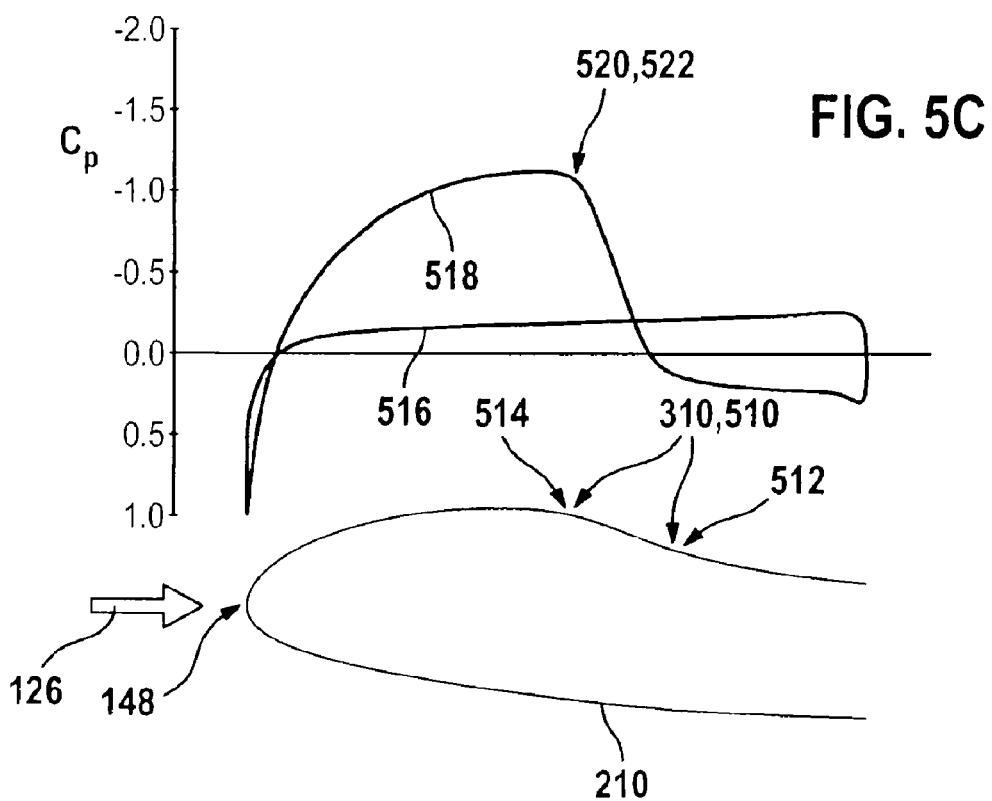
FIG. 5c shows a pressure profile over a fifth exemplary embodiment of a plug-in sensor.

Additional exemplary embodiments of airfoil profiles 210 are shown schematically in FIGS. 5A through 5B, which likewise have separation elements 310. In contrast to the exemplary embodiments in FIGS. 3 and 4, however, these separation elements 310 have no sharp edges with irregularities in the gradients (bends), but they have separation elements 310 having a steady extension of the gradient of airfoil profile 210. FIGS. 5A and 5C show exemplary embodiments of hill profiles 510 having an additional turning point 512, whereas FIG. 5B shows an exemplary embodiment of a hill profile 510 without turning point. In the hill profiles 510 according to FIGS. 5A and 5C, an individual maximum 514 can be seen, i.e., a point at which the gradient of airfoil profile 210 makes a steady change from a positive gradient to a negative gradient (from the inflow side to the discharge side). Separation elements 310 having a steady course of the gradient have the advantage over the bends that less interference is caused in the flow of the fluid medium. The overall pressure drop at airfoil profile 210 is less because of that. In addition, separation elements 310 with a steady extension of their gradient pose a lesser risk of reattaching the separated flows, especially at low flow velocities.

Above airfoil profiles 210 in FIGS. 5A to 5C, a pressure profile 516 is plotted on the underside of airfoil profile 210, and a pressure profile 518 is plotted on the upper side of airfoil profile 210, which was calculated using simulation calculations. The so-called pressure coefficient $c_p$ is plotted here, that is, the dimensionless ratio between the pressure and the dynamic pressure, as a function of the position along profile center line 214 (which is not shown in these figures). It should be noted that the axis of pressure coefficient $c_p$ is inverted in this case, so that negative values are plotted in the upwards direction.

As may be seen from the plotting of the pressure coefficients, pressure profile 516 has a uniform progression on the underside of airfoil profile 210 in each case, whereas pressure profile 518 has an abnormality 520 on the upper side of airfoil profile 210 in each case. This abnormality 520 is developed as a minimum 522 in pressure. Correspondingly, in this region of abnormality 520 there occurs a maximum in the flow velocity of the air. It has been shown that this abnormality 520, which is spatially defined at airfoil profile 210 by the described contour of airfoil profile 210 having separation element 310, is well suited for fixing separation point 224 on the upper side of airfoil profile 210, so that the flow separation takes place in a defined manner and without greater fluctuations during operation.

An additional positive side effect of the example of airfoil profiles 210 illustrated in FIGS. 5A through 5C is that, as pressure profiles 516 on the underside indicate, a stronger acceleration of the flow takes place on this underside of the airfoil profile. That being so, all tendencies of the flow to detach itself in this region are normally prevented in a reliable manner.

Figure 6A:
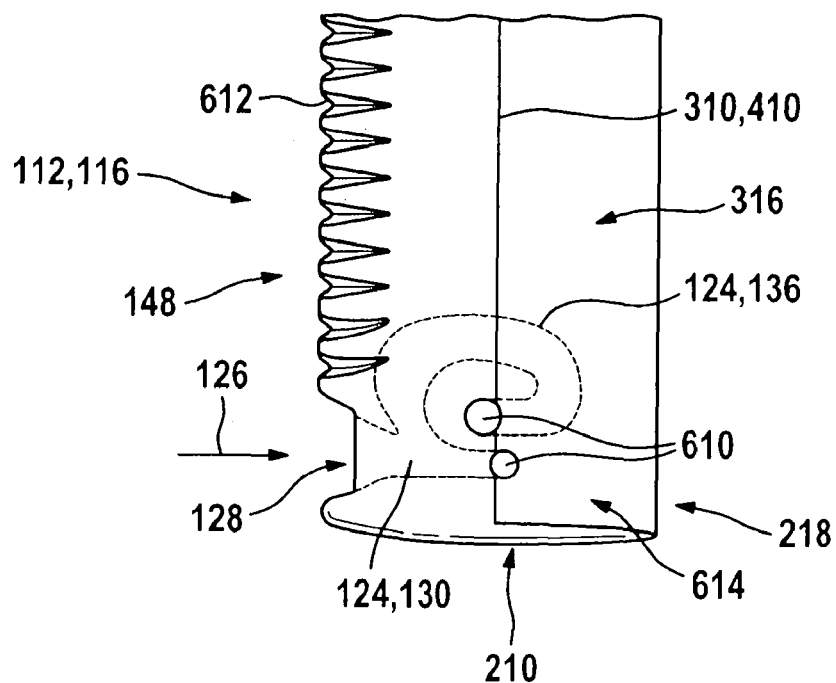
FIG. 6A shows a side view of a plug-in sensor having two outlet openings in the region of a separation element.
Figure 6B:
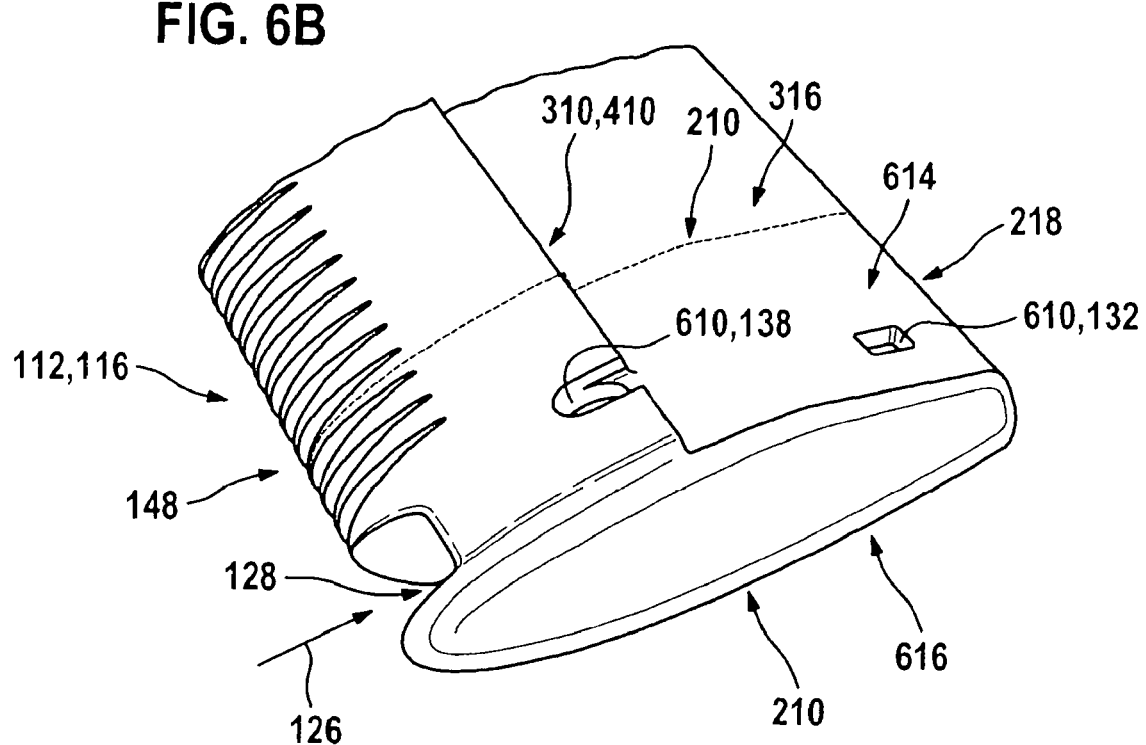
FIG. 6B shows an exemplary embodiment of a plug-in sensor as an alternative to FIG. 6A, in which only one outlet opening is disposed in the region of a separation element.

FIGS. 6A and 6B show two different exemplary embodiments of plug parts 116 of a hot-air mass film meter 112 in perspective manner, in which outlet openings 610 along airfoil profile 210 are positioned in different ways. Airfoil profile 210, as shown in FIG. 6B by the dashed line, corresponds to the airfoil profile according to the exemplary embodiment in FIG. 4, i.e., a separation element 310 having a stepped profile 410 is provided. Analogously, however, any other design of separation element 310 may be used as well, for example the development in FIG. 3 or in FIGS. 5A through 5C.

Inflow side 148 of plug part 116 once again has a rounded design, and a plurality of slots 612 have been formed in inflow side 148 in this exemplary embodiment. The function of these slots lies in the stabilization of the turbulence of the boundary layer and is described in published German patent document DE 10 2004 022 271.

The two exemplary embodiments according to FIGS. 6A and 6B differ in the position of outlet openings 610. In both cases a flow channel 124 is provided inside plug part 116, which is indicated merely by a dashed line in FIG. 6A and which cannot be seen in FIG. 6B. Once again flow channel 124 is provided with a main channel 130 and a bypass channel 136, sensor chip 144 (not shown in FIG. 6A) being disposed in bypass channel 136. Thus, the arrangement is essentially similar to the exemplary embodiment according to FIG. 1B, which corresponds to the related art as far as form and function are concerned.

In this set for the exemplary embodiment according to FIG. 1B, in the exemplary embodiment according to FIG. 6A, however, both outlet openings 610 are provided in the side wall of plug part 116, in particular bypass outlet 138, which is disposed on the underside of plug part 116 in the exemplary embodiment according to FIG. 1B. The side wall in which both outlet openings 610 are provided is symbolically denoted by reference numeral 614 in FIG. 6A, the opposite side (cf. FIG. 6B) by 616. It can be seen that bypass outlet 138 is disposed in such a way that it comes to lie on separation element 310 formed as stepped profile 410. This development, which can also be found in the example according to FIG. 6B, offers the advantage compared to the related art according to FIG. 1B that bypass outlet 138 now is disposed in the region of the pressure minimum or the velocity maximum. The suction effect is amplified accordingly, and the air-mass throughput through bypass channel 136 in increased. This considerably increases the signal level swing of hot-film air mass meter 112, and the signal-to-noise ratio is greatly improved.

As a comparison of FIGS. 6A and 6B shows, main flow outlet 132 is able to be placed in the region of rear 218 (FIG. 6B), or this main flow outlet 132 may also be placed in the region of separation element 310 (FIG. 6A). The latter development offers a similar advantage as in the case of bypass outlet 138, i.e., a placement in the region of a velocity maximum leads to an optimal air-mass throughput through hot-film air mass meter 112. This, too, improves the signal quantity, as described above.

What is claimed is:

1. A plug-in sensor for determining at least one parameter of a flowing air mass of an internal combustion engine flowing through a flow pipe in a main flow direction, comprising:
a plug part configured to be introduced into the flowing air mass with a specified alignment to the main flow direction, wherein the plug part has at least one flow channel having at least one inlet opening and at least one outlet opening;
a bypass flow channel branching off the at least one flow channel in the main flow direction; and
at least one sensor for determining the at least one parameter, wherein the at least one sensor is accommodated in the bypass flow channel of the plug part;
wherein the plug part has a rounded inflow side directed counter to the main flow direction, and wherein the at least one flow channel has the at least one inlet opening in a region of the rounded inflow side, wherein the plug part has at least one airfoil profile configured in such a way that an asymmetrical flow profile of the air mass results on different sides of the plug part when the plug part is introduced into the flowing air mass, and wherein the bypass flow channel and the at least one sensor are contained within the at least one airfoil profile.

2. The plug-in sensor as recited in claim 1, wherein the at least one outlet opening is disposed laterally on the at least one airfoil profile.

3. The plug-in sensor as recited in the claim 1, wherein the at least one flow channel has at least one main channel having at least one main flow outlet opening, and the at least one bypass channel has at least one bypass outlet opening, and wherein at least one of the at least one main flow outlet opening and the at least one bypass outlet opening is disposed laterally on the at least one airfoil profile.

4. The plug-in sensor as recited in claim 3, wherein the at least one airfoil profile has a first side having the at least one outlet opening and a second side without the at least one outlet opening, the airfoil profile being configured such that, when the plug part is introduced into the flowing air mass, a flow profile results in which the velocity of the flowing air mass is higher on the first side than on the second side.

5. The plug-in sensor as recited in claim 3, wherein, on a side facing away from the flow when the plug-in sensor is introduced into the flowing air mass, the at least one airfoil profile has a cut-off rear which is essentially perpendicular to the main flow direction.

6. The plug-in sensor as recited in claim 3, wherein, when the plug part is introduced into the flowing air mass, the at least one airfoil profile has an angle of incidence $\alpha$ of between 0° and 7° to the main flow direction.

7. The plug-in sensor as recited in claim 3, wherein the at least one airfoil profile has a profile curvature of between 0% and 10%.

8. The plug-in sensor as recited in claim 3, wherein the at least one airfoil profile is configured in such a way that, when the plug part is introduced into the flowing air mass, at least a local pressure minimum occurs in at least one separation zone on at least one side of the at least one airfoil profile, the at least one outlet opening being disposed at least partially in the at least one separation zone.

9. The plug-in sensor as recited in claim 8, wherein the at least one airfoil profile has at least one separation element on at least one side, the at least one separation element being configured to induce at least a local pressure minimum when the plug part is introduced into the flowing air mass.

10. The plug-in sensor as recited in claim 9, wherein the at least one separation element has at least one of the following profiles:
a bent profile having a discontinuous gradient, the gradient of the at least one airfoil profile changing in a discontinuous manner;
a stepped profile having at least one step in the at least one airfoil profile;
a hill profile, the gradient of the at least one airfoil profile in the hill profile making a continuous change from a positive gradient to a negative gradient from the inflow side toward the discharge side, the curvature in the region of the negative gradient being more pronounced than in the region of the positive gradient;
a turning profile having at least one turning point in the extension of the at least one airfoil profile.

11. The plug-in sensor as recited in claim 10, wherein a bent profile is provided, the airfoil profile on the inflow side in front of the bent profile extending in a curved manner at a positive gradient, and the at least one airfoil profile on a downstream side behind the bent profile extending at a negative gradient.

12. The plug-in sensor as recited in claim 9, wherein the at least one outlet opening is at least one of: a) at least partially disposed in the region of the at least one separation element; and b) at least partially disposed downstream from the at least one separation element.

13. The plug-in sensor as recited in claim 1, wherein the bypass flow channel branches off the at least one flow channel in the main flow direction at a nose directed toward the main flow direction and the bypass flow channel includes a bypass outlet opening disposed in a lower pressure region of the at least one airfoil profile to provide a suction effect.

* * * * *